United States Patent [19]

Stanaitis

[11] 3,971,086
[45] July 27, 1976

[54] METHOD OF FABRICATING A FASTENER ASSEMBLY

[75] Inventor: Peter P. Stanaitis, Rockford, Ill.

[73] Assignee: Textron, Inc., Providence, R.I.

[22] Filed: July 16, 1975

[21] Appl. No.: 596,320

Related U.S. Application Data

[62] Division of Ser. No. 443,136, Feb. 14, 1974, Pat. No. 3,913,649.

[52] U.S. Cl. .............................................. 10/155 A
[51] Int. Cl.² ..................... B23P 19/08; B21H 3/02
[58] Field of Search .............. 10/10 R, 27 R, 155 R, 10/155 A; 151/37, 38, 69

[56] References Cited
UNITED STATES PATENTS

| | | | |
|---|---|---|---|
| 2,672,069 | 3/1954 | Mitchell | 151/37 X |
| 3,009,176 | 11/1961 | Knocke | 10/155 A |
| 3,037,221 | 6/1962 | Lanius | 10/155 A |
| 3,777,796 | 12/1973 | Takano | 151/38 |
| 3,888,289 | 6/1975 | Reynolds | 151/38 |

FOREIGN PATENTS OR APPLICATIONS

| | | | |
|---|---|---|---|
| 5,650 | 3/1971 | Japan | 10/155 A |
| 480,553 | 12/1969 | Switzerland | 151/37 |

Primary Examiner—Lowell A. Larson
Assistant Examiner—E. M. Combs
Attorney, Agent, or Firm—Olson, Trexler, Wolters, Bushnell & Fosse, Ltd.

[57] ABSTRACT

The present disclosure relates to a novel externally threaded fastener unit and the novel combination resulting from employment of said unit with an internally threaded element, such as a nut or the like, and the method of manufacture thereof. The fastener unit includes a headed screw member having a frusto-conical washer preassembled thereon and held in captive relation by the external thread form. Disposed adjacent the threaded portion of the screw member is an unthreaded neck section of a controlled cross-sectional dimension. This neck section is designed to have a dimension which is less than the minimum minor dimension of an internal thread designed in accordance with industry specified dimensions and tolerances for mating engagement with the external thread on said fastener. Thus, the screw member may be advanced along the internally threaded portion of said element, with said internal threads passing over the unthreaded neck section, without producing interfering engagement therewith, such that effective compression of the frusto-conical washer can be obtained regardless of the relative thinness of the workpieces being clamped with the fastener unit.

2 Claims, 7 Drawing Figures

METHOD OF FABRICATING A FASTENER ASSEMBLY

REFERENCE TO RELATED APPLICATION

This application is a division of U.S. Pat. application Ser. No. 443,136 filed Feb. 14, 1974 now Pat. No. 3,913,649.

BACKGROUND OF THE INVENTION

The present invention relates to a fastener assembly and more specifically to a preassembled fastener unit engageable with an internally threaded element, such as a nut to provide a clamped joint for one or more workpieces. The fastener unit of the present invention is of the general type comprised of a screw threaded member having a frusto-conical washer mounted thereon in captive, assembled relation by the external thread form.

Before discussing in detail the present invention, it is believed that a brief review of the prior art as to the structural features and inherent deficiencies thereof will be beneficial. It is only after one recognizes what is demanded in the art and what has been tried in order to fulfill this demand that the present invention can be viewed in its proper perspective and appreciated. In this regard, preassembled fastener units, such as discussed above, viz, a washer captively assembled to a screw threaded member, have long been known and used in the art. In point of fact, many industries, and primarily the automobile industry, specify use of preassembled fastener units in the numerous installations or joints that must be effected in the manufacture of their products. It should be noted, that the fastener units being referred to are of the type which employ a frusto-conical washer, the use of which serves to maintain a tight joint.

In manufacturing these preassembled fastener units of the prior art type, an unthreaded, headed blank is provided and the frusto-conical washer member positioned thereon, adjacent the head portion. The fastener blank is then subjected to a thread forming process, such as thread rolling wherein a screw thread is formed on a portion thereof. This type of threading procedure produces, in effect, an upsetting of the blank material and a re-working thereof to produce a desired thread form, and must be distinguished from a machining operation wherein the blank material is removed to provide the thread form. When a thread is produced by a cold-working process, the major dimension of the thread form produced, i.e., the crest diameter, is necessarily greater than the original cross-sectional dimension of the unthreaded blank portion, while the minor thread dimension, i.e., the root diameter, is less than the original cross-sectional dimension of the unthreaded blank portion. Accordingly, by sizing the washer aperture so that it will freely pass over the unthreaded blank portion and subsequently forming the thread as discussed above, the resulting major thread diameter will be greater than the aperture dimension and thus will serve to maintain the apertured washer in assembled relation on the screw shank.

It will be appreciated from the above, that the thread forming takes place with the washer assembled on the shank, adjacent the headed portion thereof. Therefore, where a frusto-conical washer is employed, the external thread thus formed can only extend along the shank to a location coincident with a plane defined by the rim of the washer. That is to say, the frusto-conical washer prevents the thread rolling dies from extending into the concavity of the washer.

Consideration is now directed to some of the problems inherent with the above-mentioned prior art structures, which are overcome by the present invention as will be discussed more completely hereinafter. At numerous installations in an automobile, the fastener units of the type discussed above are prescribed by design engineers for engagement with a nut to clamp one or more workpieces. Frusto-conical washers are specified in many instances, such that they can be compressed during the formation of the joint to establish residual forces which will maintain a relatively tight joint. These residual forces are obtained only due to the elastic deformation or deflection of the washer upon assembly. Therefore, should said deflection not be obtained, there is a danger that the joint will come loose in service.

In a joint, wherein a relatively thin workpiece or pieces are clamped between the fastener unit and the nut element, as is frequently the case in automobile constructions, a distinct problem exists with the prior art type of construction. In this regard, the nut must be advanced toward the driving head a sufficient distance to effect the desired compression or deflection of the frusto-conical washer. However, the extent of travel of the nut is limited by the external thread length, in that the internal thread of the nut will engage the unthreaded portion of the fastener shank in interfering engagement and preclude any further advancement of said nut. With relatively thin workpieces this often will occur before the desired degree of deflection or compression of the washer can be obtained. As such, the joint may become loose in service, and considering automobiles, for example, will generally produce a rattle. Needless to say, when a rattle results, it is the manufacturer's obligation, through its dealer, to correct this rattle which necessitates the costly expenditure of considerable effort and time.

Again, with a view toward placing the present invention in proper perspective, the above-noted and discussed problems with the prior art type of fastener unit shown in the drawing has been recognized by those skilled in this art, and numerous solutions have been proposed, as will be discussed hereinafter. Insofar as it is known, all of the prior art solutions involve an attempt to extend the external thread into the concavity of the washer, which is accomplished by assembly of the frusto-conical washer to the screw member after formation of the external thread.

More specifically, with the approach taken by the prior art devices, the washer member is provided with central aperture structures which allow it to be engaged over the external thread form and then the material of the washer body deformed or staked to reduce the effective minimum dimension of said aperture to a value of less than the major diameter of the external thread. The washer is thus captively assembled on the screw member and since thread forming takes place prior to assembly of the washer, the screw thread may be extended inwardly of the rim of the conical portion.

The fastener units of the general type discussed in the preceding paragraph are of numerous and varying designs. For example, the washer may be provided with one or more tabs about the central aperture, which tabs are initially deflected outwardly so as to permit the washer to pass over the external thread, and are then deformed inwardly to produce the captive relation. Or alternately, the washer may be initially formed with a flared neck portion which defines the central aperture, which is subsequently deflected or staked inwardly to reduce the effective diameter of said aperture and produce the desired, preassembled unit.

It should be kept in mind that all of these prior art approaches involve an additional assembly operation, subsequent to the thread forming step, which subsequent operation in and of itself is an inherent disadvantage from the standpoint of production costs. More importantly, these prior art constructions are possessed of certain inherent structural disadvantages which can materially affect their reliability and performance in service. Specifically, with the prior art method of subsequently assembling the washer, the washer first must be subjected to an initial forming operation to provide the desired structural configuration adjacent the aperture, and then deformed a second time to effect the preassembled engagement with the threaded screw member. This cold-working of the washer material often produces stress cracks or zones of cold worked, brittle material that could subsequently result in cracks.

These cracks often migrate to the exterior of the washer and thus result in a complete fracture. When fracture occurs, the washer is incapable of functioning to the intended degree and the joint may fail or a rattle result.

Thus, while the above-discussed prior art devices and methods amount to a distinct step forward solving the basic problems inherent with the fastener of the type shown in FIG. 1, and provide a measure of satisfactory performance, there still existed room for improvement. The present invention serves materially to fill the void left by these devices and provides numerous advantages over the prior art concepts in both ease of manufacture, cost and dependability.

SUMMARY OF THE INVENTION

The present invention will be summarized briefly herein, and more specifically hereinafter with reference to the detailed description of the invention had in conjunction with the drawings. Keeping in mind the above-discussion of the basic problem and the prior art solutions, the present invention provides a fastener unit wherein the washer is preassembled prior to thread rolling; the washer is not subjected to crack producing deformation in the initial fabrication or assembly operation; specifically configured washer members need not be designed and employed; and the finished fastener unit is fabricated without the additional assembly step subsequent to thread forming, required with the prior art constructions.

The present invention achieves the above-noted advantages by the employment of an unthreaded neck section immediately adjacent the externally threaded portion. This neck section is sized such that the effective cross-sectional dimension or diameter thereof is less than the minimum dimension of an internal thread form designed for mating engagement with the externally threaded portion of the fastener. Thus, the internally threaded member may be advanced along the threaded portion of the fastener toward the driving head, with the internal thread form passing over the unthreaded neck section without the production of interfering engagement which would preclude further advancement of the nut. This, then permits the desired degree of compression of the frusto-conical washer to be obtained even though relatively thin workpieces are involved.

In understanding the basic concept involved here, it must be taken into account that the screw manufacturing industry has established various dimensional standards and tolerances for mating internal and external threads. Thus given a particular type of external thread form, the minimum internal dimension of the mating thread is known and the cross-sectional dimension of the neck portion designed to accommodate such a thread form. As a further feature, the neck section is also, preferably designed such that the cross-sectional sectional dimension thereof is greater than the minor dimension of the external thread, i.e., the root diameter, such that the neck section of the fastener would have a higher tensile strength than the threaded portion thereof, and any failure of the fastener in service will take place through the engaged threads.

DESCRIPTION OF THE ILLUSTRATED EMBODIMENT

Figure 1:
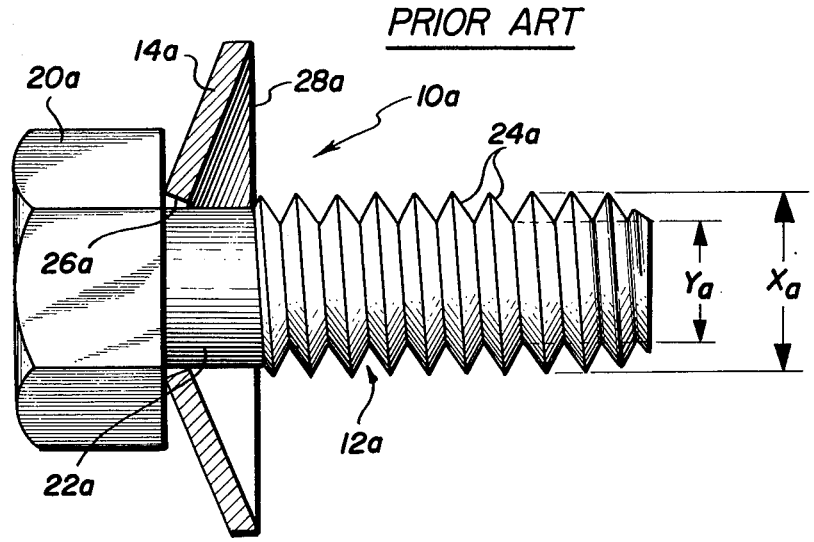
FIG. 1 is an elevational view of the prior art type of fastener discussed above, with the frusto-conical washer shown in section.
Figure 2:
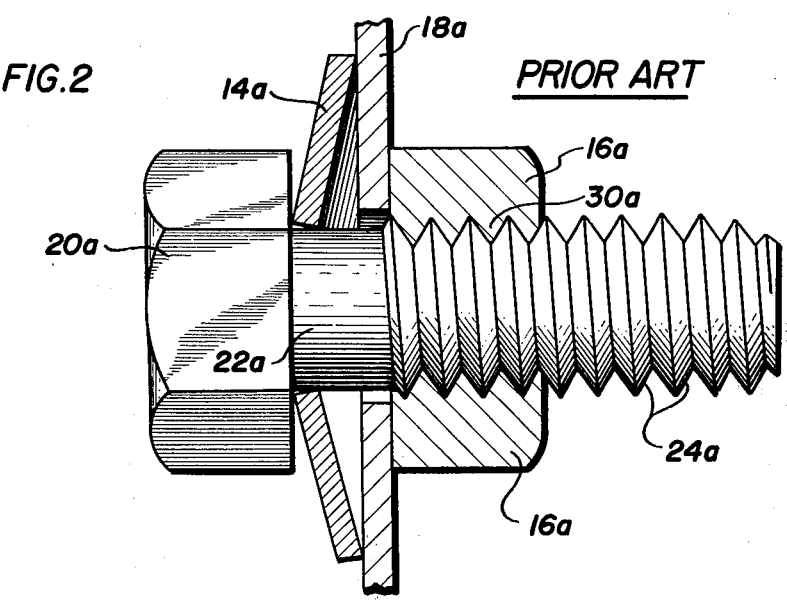
FIG. 2 is an elevational view, partially in section, of a joint produced with the prior art fastener of FIG. 1.

Turning now to the drawings, FIGS. 1 and 2 illustrate one form of prior art type fastener unit and a resulting joint fabricated therewith, which are subject to the above discussed disadvantages. For purposes of further understanding of the present discussion and of the inherent problems with the prior art type of fastener unit, a brief discussion will be had as to the structural features of the fastener of FIG. 1. In this regard, the reference characters employed will be designated by the suffix *a;* which suffix will be omitted in the subsequent reference to the structural components of the fastener unit of the present invention. Further, while a nut is illustrated in the drawings and referred to hereinafter, it is understood that other types of internally threaded members may be employed in conjunction with the fastener unit of the present invention.

The fastener unit as shown in FIG. 1 is designated generally 10a, and is comprised of a screw member 12a having a captive frusto-conical washer 14a thereon. In FIG. 2, the fastener unit 10a is shown in an assembled joint structure wherein a nut element 16a is engaged with said fastener unit to maintain one or more workpieces 18a in assembled, clamped relation. It should be noted that for purposes of clarity, the workpiece 18a is shown as a single thickness, which may be the case, but more often two or more thicknesses of material will be employed.

Returning now to the fastener unit 10a, and specifically the screw member 12a, said screw member is of a generally standard configuration, including a driving head 20a, an unthreaded shank portion 22a and a threaded shank portion 24a. The screw member is initially formed from a blank having an unthreaded shank of a generally constant diameter equal to that of the unthreaded shand section 22a. Accordingly, after the washer 14a is positioned over the unthreaded blank, and the blank cold-worked to produce the thread form 24a, said thread form will have a major dimension (often referred to as a crest diameter) Xa, greater than the original diameter of the blank, and a minimum thread formed dimension Ya (often referred to as the root diameter) less than the diameter of the unthreaded blank. The size of the aperture 26a and the washer 14a is controlled, such that said washer can be easily positioned over the unthreaded blank, but will be held in captive relation thereon, subsequent to the formation of the thread form 24a.

It should be noted that since the washer 14a is frusto-conical in shape, upon rolling it is not possible to extend the thread form 24a into the concavity of the washer beyond the plane defined by the edge 28a thereof. Such is the case, since the washer will abut against the die and the fastener head to preclude die engagement with the blank material beyond said plane.

Turning now to FIG. 2, an assembled joint employing the fastener unit 12a is illustrated. In conjunction with a workpiece or pieces 18a of relatively thin thickness. As such, as the internal thread form 30a on the nut 16 advances along the external thread 24a, it will eventually engage the unthreaded portion 22a in interfering relation. Assuming a relatively thin workpiece or pieces 18a, this interfering engagement often will occur before the desired compression of the frusto-conical washer 14a is attained. As such, the residual locking forces sought to be set up in the joint through the use of the conical washer will not be realized and the joint may become loose in service, with a bothersome rattle resulting.

Figure 3:
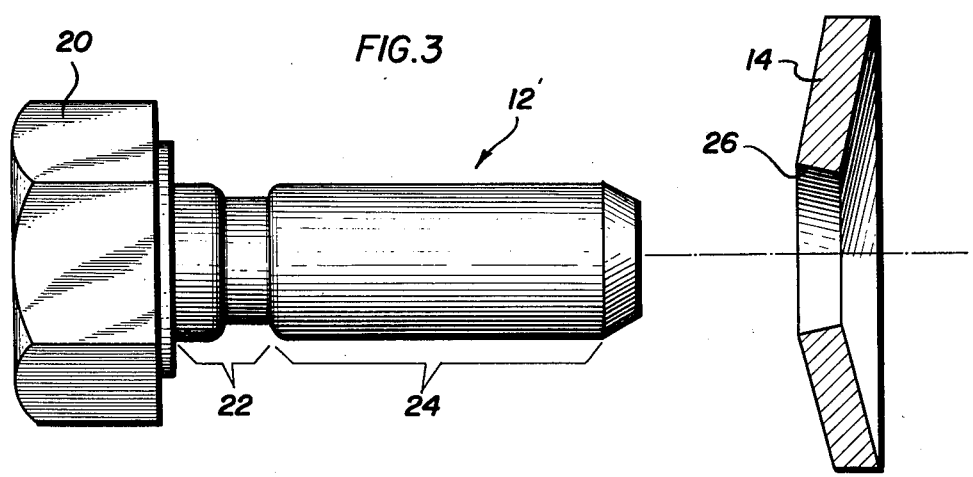
FIG. 3, is an exploded view illustrating the frusto-conical washer and the fastener blank employed to produce the fastener unit of the present invention.
Figure 4:
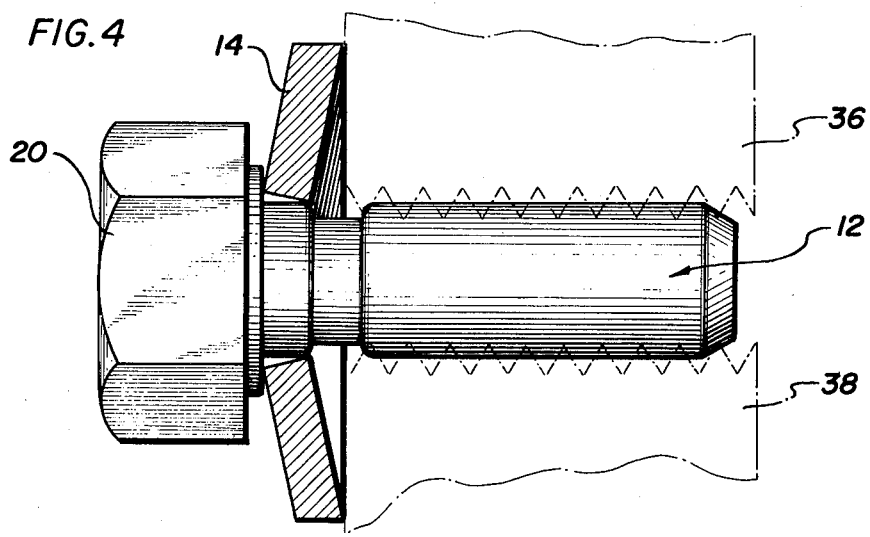
FIG. 4, is a partial schematic view showing the manner in which the blank of FIG. 3 is engaged between thread dies to produce the fastener of the present invention, said dies being illustrated in phantom.

The fastener unit of the present invention is illustrated in FIGS. 3–7, with FIGS. 3 and 4 illustrating the novel method of manufacturing of said fastener units. Considering first, FIG. 5, the fastener unit 10 of this invention includes a screw member 12 having a driving head 20, a threaded portion 24 and a nonthreaded portion 22 disposed intermediate said driving head and said threaded portion. A frusto-conical washer 14 is carried on the screw member 12 proximate the unthreaded portion 22. As was the case with the prior art construction, the diameter of the aperture 26 in said washer is sized to be less than the major diameter of the thread form 24, so that a captive relation is attained.

The unthreaded section 22 includes a first segment 31 immediately adjacent the driving head 20, and a second, reduced diameter neck segment 32 immediately adjacent the external threaded portion 24. As can be seen, the respective segments merge rather abruptly, there being provided an arcuately shaped annular shoulder 34. The purpose and function of the structural features discussed in this paragraph will become apparent with respect to the joint effected with the fastener, as discussed with regard to FIGS. 6 and 7.

Figure 5:
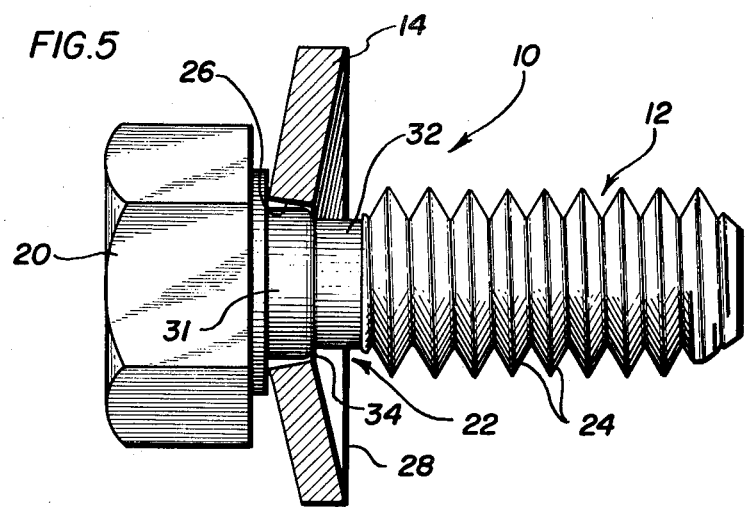
FIG. 5 is an elevational view, partially in section, illustrating the fastener of the present invention.
Figure 6:
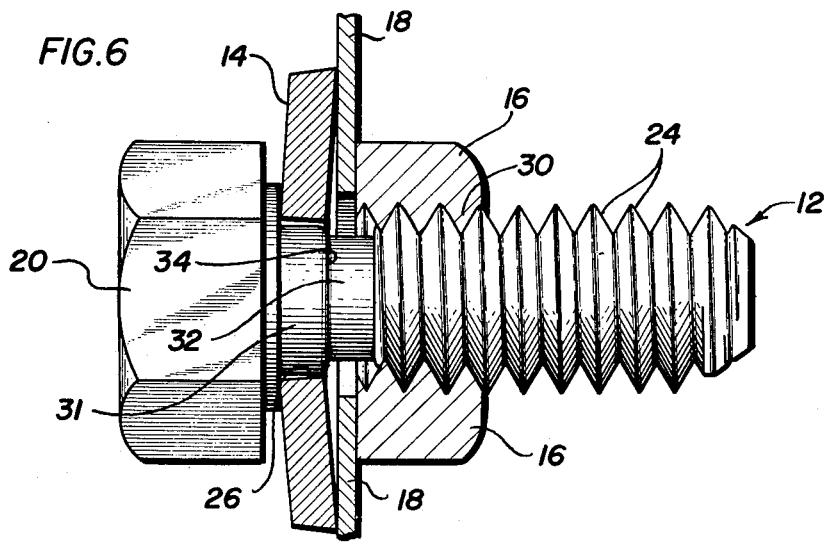
FIG. 6 is an elevational view partially in section, illustrating the fastener of FIG. 5, employed in an assembled joint structure.

A completed joint structure effected with the fastener unit 10 of FIG. 5, is shown in FIG. 6. In this regard, a nut 16 is engaged with the external thread form 24, with a workpiece or pieces 18 clamped between said nut and the driving head 20, the frusto-conical washer 14 being disposed between said head and the workpiece. In the illustrated condition, it can be seen that the washer 14 has been substantially fully deflected or compressed to establish the necessary residual forces to maintain the integrity of the joint. This result is attainable with the fastener 10, regardless of the thickness of the workpiece, due to the employment of the reduced diameter segment 32 as explained hereinafter.

During assembly of the joint of FIG. 6, as the nut 16 is advanced along the thread form 24 toward the driving head, the washer 24 will ride up on the first segment 31 of the unthreaded portion 22, which segment serves to center said washer with respect to the axis of the screw member 12. This action is facilitated by employment of the arcuately shaped shoulder 34 which precludes the rim of the washer provided by the aperture 26 from hanging up thereon. Once the washer 14 is centered, continued tightening or advancement of the nut 16 will produce the desired deflection or compression of said washer 14. Assuming, as was the case with the prior art fastener 10a, a relatively thin workpiece, continued compression of said conical washer can be attained even after the internal thread form 30 reaches the inwardmost extremity of the thread portion 24. With the thread form 24 extending to the neck segment 32 in the absence of any intermediate unthreaded portion, and said neck segment sized to have a dimension less than the minimum minor allowable dimension of the internal screw form 30, said screw form 30 can pass over said internal neck portion without interfering engagement. Thus continued clamping can be effected until the desired deflection of the washer is attained.

It should be noted that by sizing the relative length of the first unthreaded segment 31 to coincide with the thickness of the washer 14, it is assured that even the thinnest workpieces can be clamped, as the nut can thus move to a location substantially in abutting engagement with said shoulder 34. Of course, in a situation such as this, it must be assured that sufficient thread turns are provided on the nut member to insure continued engagement with the external thread form 24.

Figure 7:
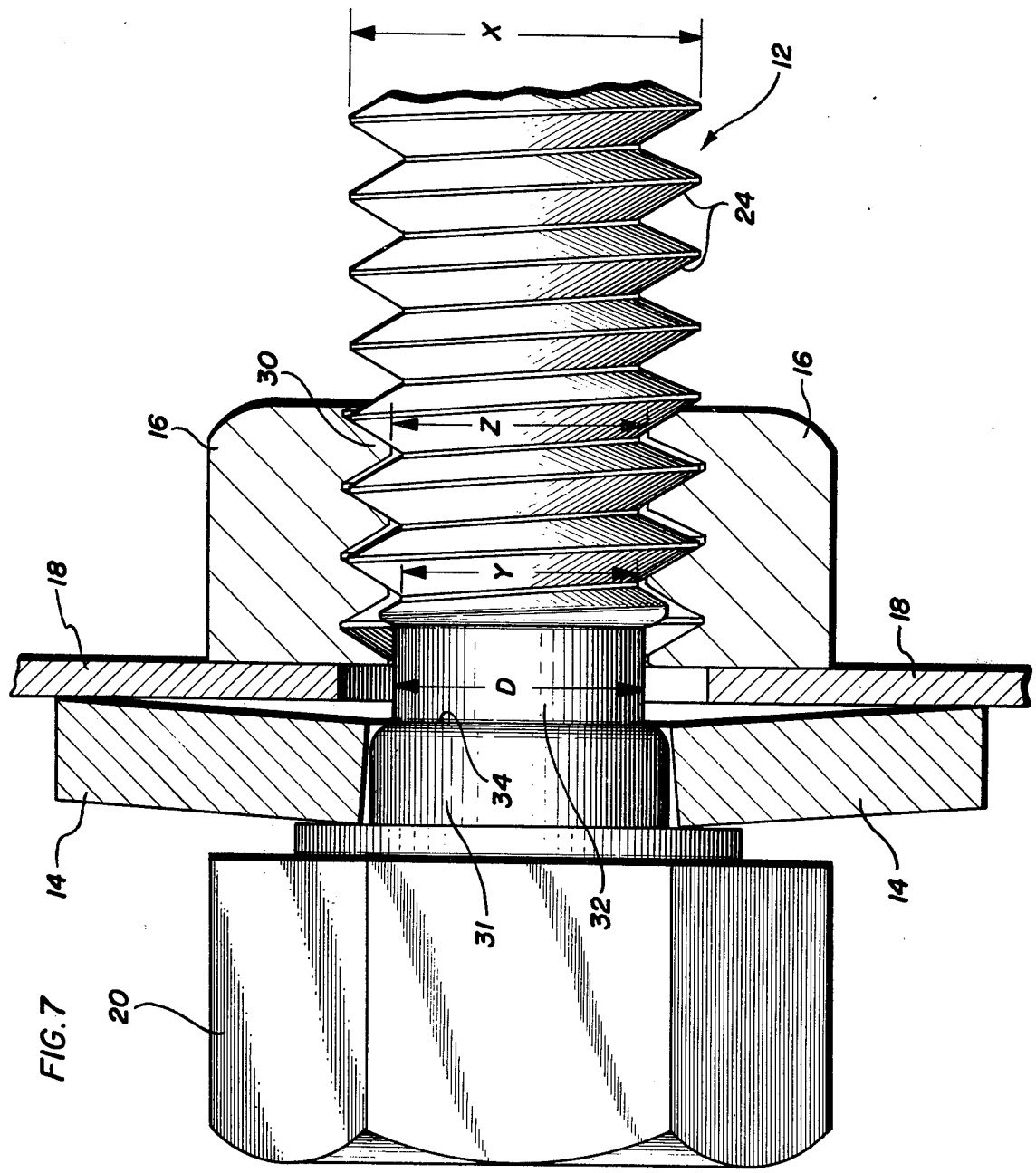
FIG. 7 is a partial, elevational view of the joint of FIG. 6 on an enlarged scale.

Consideration is now invited to FIG. 7 wherein the structural relationship of the elements of the joint shown in FIG. 6 are illustrated on an enlarged scale. Initially, attention is directed to the respective thread forms 24 and 30. As can be seen, these threads are in engagement along a single flank interface, the following flank with regard to the external thread 24. With reference to the above-comments concerning the industry accepted and specified dimensional standards, for mating internal and external threads, certain maximum and minimum values are specified with regard to:

a. major dimension of the external thread (crest diameter), designated X, in FIG. 7;
b. the minor dimension of the external thread (male thread root diameter) designated Y, in FIG. 7;
c. the minimum dimension of the internal thread (female thread crest dimension) designated Z, in FIG. 7; and
d. the major dimension of the internal thread (female thread root diameter).

These tolerances are selected so that the respective major and minor dimensions do not so coincide, as such a condition would result in interfering contact that would ultimately produce galling of the threaded parts.

Another feature of the present invention is the desirability of controlling fracture or failure of the screw member 10, should this occur. That is, any failure of said screw member 10 should take place across the external thread form 24, and not in the area of the neck segment 32. To assure this, and still maintain the neck segment 32 of a dimension less than the dimension Z of the internal thread form 30, the neck 32 is sized to fall within the tolerance range between the respective minor dimensional values of the thread forms 24 and 30. That is to say, that the dimension of the neck portion 32 (designated "D") must be slightly greater than the dimension Y, but less than the dimension Z. For example, taking into account certain industry accepted standards and assuming a 5/16 inch — 18 thread (5/16 inch nominal size with 18 threads per inch manufactured to Class 2A);

Y — the maximum minor external thread dimension permitted is — 0.2431;

Z — the minimum minor internal thread dimension is — 0.2524; *and

D — the dimension of neck 32 would be — 0.2470 to 0.2520.

Assuming a ¼ inch - 20 thread:

Y — the maximum minor external thread dimension is — 0.1876;

Z — is — 0.1959 (83 1/3%); and

D — would be 0.190 — 1950.

* This value depends upon the desired degree of engagement between the respective threads, the above-noted value being for 83 1/3% engagement and for lesser degrees of engagement Z would equal 0.2620 – 70% and 0.2690 – 60%.

Turning now to FIGS. 3 and 4, the method of producing the fastener unit 10 will be detailed. Initially, a headed, unthreaded blank is provided, designated generally 12'. The blank has a pre-formed driving head 20, and an unthreaded shank. This shank includes a first, forward portion 24' in which the thread is to be formed. Intermediate the head is a second or intermediate unthreaded segment 22', which will ultimately provide the respective segments 31 and 32 discussed previously.

When the blank 12' is fabricated, the segment 31 and the reduced diameter neck segment 32 are sized to their desired final dimension, taking into account the externally threaded configuration to be formed and the dimension of a corresponding mating internal nut thread. Further, the forward portion 24' is also sized to provide sufficient material to permit formation of the thread form 24.

Next, the washer 14 is engaged over the unthreaded shank, and the parts engaged between a pair of thread rolling dies 36 and 38. The dies 36 and 38 are of a standard, known configuration, and designed to produce the thread form 24. As the fastener emerges from the dies, the thread 24 will be fully formed, and as discussed above, will hold the washer in captive relation thereon. The thread 24 thus formed must lead into the neck segment 32, in the absence of any unthreaded portions having a cross-sectional dimension greater than the minimum minor diameter of the internal nut thread.

For purposes of illustration and discussion, a preferred embodiment of the present invention has been illustrated and described. It is envisioned that those skilled in this art may well devise various changes, alterations or substitutions, which may vary from disclosed structure, without departing from the spirit and scope of the invention. As such, the present invention is not limited to said disclosed embodiment but rather is defined by the claims appended hereto.

The invention is claimed as follows:

1. A method of fabricating an externally threaded fastener unit of the type designed for mating engagement with an internally threaded element; said fastener unit being of the type which includes, a screw member having a head portion and an elongate shank, which shank has a threaded portion and an unthreaded portion disposed intermediate said head portion and said threaded portion, and an apertured, frusto-conical washer carried on said screw member, proximate the unthreaded portion thereof with the major diameter of said screw thread being greater than the minimum dimension of said washer aperture to maintain said washer in assembled relation thereon; said method comprising the steps of: providing a headed blank having an elongate shank, which includes, a first axial segment remote from said head and having a predetermined cross-sectional dimension, and a second axial segment immediately adjacent said first segment and of a lesser cross-sectional dimension, said second section being disposed intermediate said blank head and said first section; providing an apertured frusto-conical washer, said aperture having a minimum internal dimension greater than the cross-sectional dimension of said first shank segment; positioning said washer on said shank proximate said blank head; cold forming an external screw thread on said first shank segment only to produce a thread form having a major cross-sectional dimension greater than that of said washer aperture; and said step of forming including, the step of controlling the dimension of said external thread form such that the cross-sectional dimension of said second shank segment will be less than the minimum minor diameter of an internal thread designed in accordance with industry specified dimensions and tolerances for mating engagement with said external thread.

2. A method as defined in claim 1 wherein said step of controlling the dimensions of said thread form includes the further step of; sizing the maximum minor diameter of said external screw thread to a dimension less than that of said second shank segment, thereby providing said second shank segment with a greater tensile strength than said threaded first shank segment.

* * * * *

UNITED STATES PATENT AND TRADEMARK OFFICE
CERTIFICATE OF CORRECTION

PATENT NO. : 3,971,086
DATED : July 27, 1976
INVENTOR(S) : Peter P. Stanaitis

It is certified that error appears in the above-identified patent and that said Letters Patent are hereby corrected as shown below:

Col. 3, line 4, after "which" insert --neck--

Col. 5, line 10, "shand" should be --shank--

Signed and Sealed this

Ninth Day of November 1976

[SEAL]

Attest:

RUTH C. MASON
Attesting Officer

C. MARSHALL DANN
Commissioner of Patents and Trademarks